United States Patent
Abtin et al.

(10) Patent No.: US 9,832,234 B2
(45) Date of Patent: Nov. 28, 2017

(54) IMS INBOUND ROAMER AND SHORT NUMBER DIALING

(75) Inventors: Afshin Abtin, Sollentuna (SE); David Castellanos Zamora, Madrid (ES); Gert Öster, Järfälla (SE); Sorin Surdila, Québec (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 402 days.

(21) Appl. No.: 14/403,975

(22) PCT Filed: Jun. 1, 2012

(86) PCT No.: PCT/EP2012/060450
§ 371 (c)(1),
(2), (4) Date: Nov. 25, 2014

(87) PCT Pub. No.: WO2013/178291
PCT Pub. Date: Dec. 5, 2013

(65) Prior Publication Data
US 2015/0156221 A1    Jun. 4, 2015

(51) Int. Cl.
*H04L 29/06*    (2006.01)

(52) U.S. Cl.
CPC ...... *H04L 65/1016* (2013.01); *H04L 65/1006* (2013.01); *H04L 65/1069* (2013.01); *H04L 65/80* (2013.01)

(58) Field of Classification Search
CPC . H04L 65/1016; H04L 65/1006; H04L 65/80; H04L 65/1069
See application file for complete search history.

(56) References Cited

U.S. PATENT DOCUMENTS

| | | | |
|---|---|---|---|
| 7,116,967 B2 * | 10/2006 | Kauppinen | H04M 7/006 455/404.1 |
| 2005/0286531 A1 * | 12/2005 | Tuohino | H04L 29/1216 370/395.2 |

(Continued)

OTHER PUBLICATIONS

Ericsson et al: "Loop-back routeing", 3GPP Draft; C1-121718 24.229 REL-11 [Ravel] Loop-Back Routing, 3rd Generation Partnership Project (3GPP), Mobile Competence Centre ; 650, Route Des Lucioles ; F-06921 Sophia-Antipolis Cedex ; France, vol. CT WG1, no. Taipei, Taiwan; Apr. 16, 2012-Apr. 20, 2012, Apr. 23, 2012 (Apr. 23, 2012), XP050587906, [retrieved on Apr. 23, 2012].

(Continued)

*Primary Examiner* — Gbemileke J Onamuti
(74) *Attorney, Agent, or Firm* — Rothwell, Figg, Ernst & Manbeck, P.C.

(57) ABSTRACT

Network nodes for an access network and a home network of a first UE are described for use when routing an originating call from the first UE in the access network including an IMS network. A network node receives a SIP INVITE message associated with the originating call from the first UE, and including a called party number associated with the call. The network node determines whether the first UE is visiting the access network and whether the called party number is associated with the access network. The network node determines whether the called party number is allowable in the access network. The network node modifies and transmits the received SIP INVITE message towards a home network of the first UE to cause the home network to route the originating call to the access network.

24 Claims, 8 Drawing Sheets

(56) References Cited

U.S. PATENT DOCUMENTS

| | | | | |
|---|---|---|---|---|
| 2007/0149166 A1* | 6/2007 | Turcotte | ............... | H04W 4/22 455/404.1 |
| 2009/0047922 A1* | 2/2009 | Buckley | ............... | H04L 63/08 455/404.1 |
| 2010/0087191 A1* | 4/2010 | Kocsis | ............... | H04L 63/0853 455/433 |

OTHER PUBLICATIONS

Deutsche Telekom et al: "Addition of the transit and roaming function", 3GPP Draft; C1-121717_Ravel_TRF_Annex_WAS121625_WAS121 525_WAS121001, 3rd Generation Partnership Project (3GPP), Mobile Competence Centre ; 650, Route Des Lucioles ; F-06921 Sophia-Antipolis Cedex ; France, vol. CT WG1, no. Taipei, Taiwan; Apr. 16, 2012-Apr. 20, 2012, Apr. 23, 2012 (Apr. 23, 2012), XP050587905, [retrieved on Apr. 23, 2012)].

Holmberg I Sedlacek Ericsson C: "Indication of features supported by proxy; draft-holmberg-sipcore-proxy-feature-02.tx t", Indication of Features Supported by Proxy; Draft-Holmberg-Sipcore-Proxy-Feature-02.TX T, Internet Engineering Task Force; IETF; StandardWorkingDraft, Internet Society, (ISOC) 4, Rue Des Falaises CH- 1205 Geneva, Switzerland, No. 2, Jun. 9, 2011 (Jun. 9, 2011), pp. 1-11, XP015076370, [retrieved on Jun. 9. 2011].

* cited by examiner

IMS INBOUND ROAMER AND SHORT NUMBER DIALING

CROSS REFERENCE TO RELATED APPLICATION(S)

This application is a 35 U.S.C. §371 National Phase Entry Application from PCT/EP2012/060450, filed Jun. 1, 2012, designating the United States, the disclosure of which is incorporated herein in its entirety by reference.

TECHNICAL FIELD

The present invention relates to methods and apparatus for routing an originating call in a telecommunications network including an Internet Multimedia Subsystem (IMS) network. In particular, the invention relates to methods and apparatus for routing the originating call of an inbound roamer to the access network when the called party number is allowable for use in the access network.

BACKGROUND

IP Multimedia services provide a dynamic combination of voice, video, messaging, data, etc. within the same session. By growing the number of basic applications and the media which it is possible to combine, the number of services offered to the end subscribers will grow, and the inter-personal communication experience will be enriched. This will lead to a new generation of personalised, rich multi-media communication services, including so-called "combinational IP Multimedia" services.

IP Multimedia Subsystem (IMS) is the technology defined by the Third Generation Partnership Project (3GPP) and ETSI TISPAN group to provide IP Multimedia services over mobile communication networks. IMS provides key features to enrich the end-subscriber person-to-person communication experience through the use of standardised IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between subscriber terminals (or subscriber terminals and application servers). The Session Description Protocol (SDP), carried by SIP signalling, is used to describe and negotiate the media components of the session. Whilst SIP was created as a subscriber-to-subscriber protocol, IMS allows operators and service providers to control subscriber access to services and to charge subscribers accordingly.

By way of example, FIG. 1a illustrates schematically a telecommunications network showing an example of the IMS network architecture used for roaming users when they place a call in a Visited Public Land Mobile Network (V-PLMN). In this example, a calling party A is visiting the V-PLMN for party A (V-PLMN A or Visited operator for party A) places a call to a called party B visiting V-PLMN for party B (V-PLMN B). Each PLMN includes some IMS architecture such as Interconnection Border Control Function (IBCF) or Translation Gateway nodes (TrGw) that connect the PLMN with each other via core networks for example those based on Internetwork Packet Exchange (IPX) 1, 2, 3, and 4. An IBCF is an interconnecting gateway between an IMS network 102 and other IP networks e.g. another IMS networks or core networks etc. Each PLMN includes some IMS architecture such as registrar nodes associated with the various access domains (or networks) such as Call/Session Control Functions (CSCFs), which operate as SIP proxies within the IMS. The 3GPP architecture defines three types of CSCFs: the Proxy CSCF (P-CSCF) which is the first point of contact within the IMS for a SIP terminal i.e. calling party A; the Serving CSCF (S-CSCF) (not shown) which provides services to the subscriber that the subscriber is subscribed to; and the Interrogating CSCF (I-CSCF) whose role is to identify the correct S-CSCF and to forward to that S-CSCF a request received from a SIP terminal via a P-CSCF.

Within the IMS network architecture, Application Servers (ASs) are provided for implementing IMS service functionality. ASs provide services to end users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which ASs should be "linked in" during a SIP Session establishment (or indeed for the purpose of any SIP method, session or non-session related). The IFCs are received by the S-CSCF from a home subscriber server (HSS) during the IMS registration procedure as part of a user's or subscriber's Subscriber Profile.

The user equipment (UE) for a calling or called party may comprise or represent any device used for communications. Examples of user equipment that may be used in certain embodiments of the described network are wireless devices such as mobile phones, terminals, smart phones, portable computing devices such as lap tops, handheld devices, tablets, netbooks, computers, personal digital assistants and other wireless communication devices, or wired communication devices such as telephones, computing devices such as desktop computers, set-top boxes, and other fixed communication devices.

When the calling party A (UE A) places a call to the called party B (UE B) the call set-up process involves an originating call associated with UE A and a terminating call associated with UE B. The terms "originating call" and "terminating call" may comprise or represent the connection set-up signalling in relation to UE A or UE B, respectively. Examples of originating or terminating calls that may be used in certain embodiments of the described network include, but are not limited to, the connection set-up signalling enabling a communication connection to be made between UE A and UE B in the two call halves model. The originating call is the connection set-up signalling for UE A in the first call half and the terminating call is the connection set-up signalling for connecting the call with UE B in the second call half.

When the calling party A originates a call, the basic procedure involves the P-CSCF of the V-PLMN A receiving the originating call and routing the call from V-PLMN A to the Home PLMN for party A (H-PLMN A or Home operator for A party) via the corresponding IBCF/TrGWs. Generally, the H-PLMN or home network identifies the PLMN or network in which the profile of a user such as calling party A or called party B (e.g. a subscribers profile) is held. The H-PLMN A routes the originating call to the H-PLMN B based on the call number (B number) indicated in the originating call. Since the call number relates to a called party B in another network, the H-PLMN A routes the originating call to H-PLMN B (Home operator of B party) and it is then routed to V-PLMN B (Visited operator of B party), where the C-CSCF of V-PLMN B forwards the call to the called party B. The media is "anchored" in every network that the originating call traverses, i.e. follows the path of the call i.e. a call chain.

During the call routing procedure, the H-PLMN A may perform so-called number normalisation. In non-roaming cases, when calling party A places a call based on the H-PLMN A numbering plan using short numbers (e.g. 08-71912345 instead +46871912345), then H-PLMN A performs the necessary number conversion in-order to correct the number format according its own numbering plan. In another example, when calling party A is not roaming and dials a service number (e.g. 118118), as this number is recognised as a home service number, then the call is routed to the relevant HPLMN A service or servicer operator.

According to 3GPP Technical Standard 23.228 "IMS" Stage 2 Release 11 and other 3GPP Standards, even if the calling party A is roaming, the H-PLMN A IMS network will be within the call chain for all calls. This means that if calling party A is an IMS (e.g. VoLTE) roamer in VPLMN-A, then when calling party A dials a short number according to the dialing plan of VPLMN-A. For example, such calls may include when calling party A tries to call a called party B within the same visited network using a local number format (e.g. an inbound roamer from Germany in Sweden, dials 08-719 12345 to reach somebody in Sweden). Alternatively, calling party A (an inbound roamer) may dial a service number in the V-HPLMN A (e.g. #TAXI to get to closest taxi company in the visited network).

However, based on current IMS routing procedures, the originating call of calling party A will be routed to HPLMN-A and particularly to an IMS Application Server and multimedia telephony service (MMTel) AS (not shown) within H-PLMN A. However, since the intention of the calling party A is unknown to H-PLMN A, then an incorrect routing of the call may result due to overlapping service numbers (e.g. same service numbers are used for different purposes in H-PLMN A and V-PLMN A). Alternatively, the call may simply fail due to the number being based on a local numbering plan in the V-PLMN A, which may be unknown to the H-PLMN A network.

Therefore, there is a significant need to optimise handling of originating calls in a telecommunications network including an IMS network to minimise or even eliminate incorrect or failed routing of originating calls from inbound roaming users.

SUMMARY

It has been recognised here that whilst there are certain mechanisms for routing an originating call from an access network the calling party is visiting towards a called party or service within the access network, none of the relevant standards or systems allow for the access network to flexibly route calls dialed with non-standard format numbers. In particular, at present, the relevant standards do not provide any mechanisms that enable a user or calling party originating a call or an access network the user is visiting (e.g. a VPLMN of calling party A) to flexibly route the originating call towards a service or called party within the access network. It is an object of the present invention to provide methods and apparatus of routing an originating call from a first UE roaming in an access network of a telecommunications network comprising an IMS network to allow the originating call to be routed to the correct called party, when the called party number is allowable for use in the access network, thereby optimising quality of service within the network.

According to a first aspect of the invention there is provided a method of routing an originating call from a first UE in an access network comprising an IMS network in which the IMS network includes a network node, the method, performed by the network node. The network node receives a SIP INVITE request message associated with the originating call from the first UE, the SIP INVITE request message including a called party number associated with the call. The network node determines whether the first UE is visiting the access network and whether the called party number is associated with the access network. The network node queries a database, the database comprising a plurality of called party numbers, as to whether the called party number is allowable in the access network when the UE is visiting the access network and when the called party number is associated with the access network. The network node instructs a home network of the first UE to route the originating call to the access network when a response from the query indicates the called party number is allowable for use in the access network.

As an option, determining whether the first UE is visiting the access network further includes determining whether the first UE is IMS registered. Alternatively or in addition to, determining whether the first UE is visiting the access network further includes determining whether the home network is known to the network node. As another option, determining whether the called party number is associated with the access network further includes determining that the called party number is representative of a short code number or a short number.

Optionally, where the plurality of called party numbers include a plurality of service numbers, and the database includes policies indicating whether the plurality of service numbers are allowable for use in the access network, then determining from the database further includes: triggering the database to indicate whether the called party number is allowable for use in the access network based on the policies; and receiving a response from the database indicating whether the called party number is allowable for use in the access network.

As an option, the method may include determining, from the received response from the database, whether the called party number is allowable for use in the access network, and instructing the home network of the first UE to route the originating call to the access network when it is determined that the called party number is allowable for use in the access network. The step of determining whether the called party number is allowable for use in the access network may further comprise analysing or interpreting the received response from the database to determine whether the called party number is allowable for use in the access network.

As another option, instructing the home network further includes: modifying the received SIP INVITE request message to set a phone context parameter to the access network domain name when the called party number is allowable for use in the access network; and transmitting the modified SIP INVITE request message towards the home network. Optionally, the phone context parameter is within the Request-Uniform Resource Identifier (R-URI) of the SIP INVITE request message.

As an option, instructing the home network further includes modifying the received SIP INVITE request message to set a routing indication for routing the originating call from the home network to the access network when the called party number is allowable for use in the access network. Additionally, modifying the SIP INVITE request message further includes modifying the R-URI of the SIP INVITE request message to set the routing indication. As a further option, the network node includes the functionality of a proxy call session control function or the functionality of an interconnection border control functions.

According to a second aspect of the invention, there is provided a network node for routing an originating call from a first UE in an access network comprising an IMS network. The network node including a receiver, a transmitter, a memory unit, and processing logic, where the processing logic is connected to the receiver, to the transmitter, and to the memory unit. The receiver is configured to receive a SIP INVITE request message associated with the originating call from the first UE, the SIP INVITE request message including a called party number associated with the call. The processing logic includes determining logic configured to determine whether the first UE is visiting the access network and to determine whether the called party number is associated with the access network. The processing logic further includes query logic configured to query a database, the database comprising a plurality of called party numbers, as to whether the called party number is allowable in the access network when the determining logic determines that the first UE is visiting the access network and that the called party number is associated with the access network. The transmitter is configured to send the query to the database. The processing logic and the transmitter are further configured to instruct a home network of the first UE to route the originating call to the access network when a query response from the database indicates that the called party number is allowable for use in the access network.

As an option, the determining logic is further configured to determine whether the first UE is IMS registered for use in determining whether the first UE is visiting the access network. Alternatively or additionally, the determining logic is further configured to determine whether the home network is known to the network node when the first UE is determined to be visiting the access network. As another option, the determining logic for determining whether the called party number is associated with the access network is further configured to determine that the called party number is representative of a short code number or a short number.

Optionally, where the plurality of called party numbers include a plurality of service numbers, and the database includes policies indicating whether the plurality of service numbers are allowable for use in the access network, the transmitter and query logic are further configured to trigger the database to indicate whether the called party number is allowable for use in the access network based on the policies. The receiver logic and the processing logic are further configured to receive a response from the database indicating whether the called party number is allowable for use in the access network.

Optionally, the determining logic may be further configured to determine, from the received response from the database, whether the called party number is allowable for use in the access network. The processing logic and the transmitter may be further configured to instruct the home network of the first UE to route the originating call to the access network when the determining logic indicates that the called party number is allowable for use in the access network. The determining logic may be configured to analyse or interpret the received response from the database to determine whether the called party number is allowable for use in the access network.

As an option, the processing logic is further configured to instruct the home network by modifying the received SIP INVITE request message to set a phone context parameter to the access network domain name when the called party number is allowable for use in the IMS network. The transmitter is further configured to instruct the home network by transmitting the modified SIP INVITE request message towards the home network. Optionally, the phone context parameter is within the R-URI of the SIP INVITE request message.

As another option, the processing logic is further configured to instruct the home network by further modifying the received SIP INVITE request message to set a routing indication for routing the originating call from the home network to the access network when the called party number is allowable for use in the access network. Alternatively or additionally, the processing logic (308) is further configured to modify the R-URI of the SIP INVITE request message to set the routing indication. As a further option, the network node includes the functionality of a proxy call session control function or the functionality of an interconnection border control functions.

According to a third aspect of the invention, there is provided a method of routing an originating call from a first UE in an access network including a first IMS network towards a home network including a second IMS network. The first IMS network including a first network node in an access network the first UE is visiting. The second IMS network including a second network node in a home network of the first UE. The method, performed by the second network node, includes receiving a SIP INVITE request message associated with the originating call from the first UE in the visited access network. The SIP INVITE request message including a called party number associated with the call and an indication that the called party number is allowable for use in the visited access network. Detecting the indication within the received SIP INVITE request message that the called party number is allowable for use in the visited access network. Transmitting the SIP INVITE request message towards the visited access network.

According to a fourth aspect of the invention, there is provided a network node for use in routing an originating call from a first UE in an access network coupled to a first IMS network towards a home network including a second IMS network. The first IMS network includes a first network node associated with the access network the first UE is visiting. The second IMS network includes the network node, which is associated with a home network of the first UE. The network node comprising a receiver, a transmitter, a memory unit, and processing logic, the processing logic being connected to the receiver, to the transmitter, and to the memory unit. The receiver is configured to receive a SIP INVITE request message associated with the originating call from the first UE in the visited access network. The SIP INVITE request message including a called party number associated with the call and an indication that the called party number is allowable for use in the visited access network. The processing logic is configured to detect the indication within the received SIP INVITE request message that the called party number is allowable for use in the visited access network. The transmitter and processing logic are configured to transmit the SIP INVITE request message towards the visited access network.

The invention provides the advantages of allowing the IMS network(s) to introduce functionality to allow IMS inbound roamers to call local called party numbers while at the same time minimizing the impact of deployment on network operators and the existing IMS infrastructure.

BRIEF DESCRIPTION OF THE DRAWINGS

In order that the invention may be more fully understood, some of the embodiments of the invention will now be described, by way of example only, with reference to the accompanying drawings, in which.

DETAILED DESCRIPTION

Figure 1A:
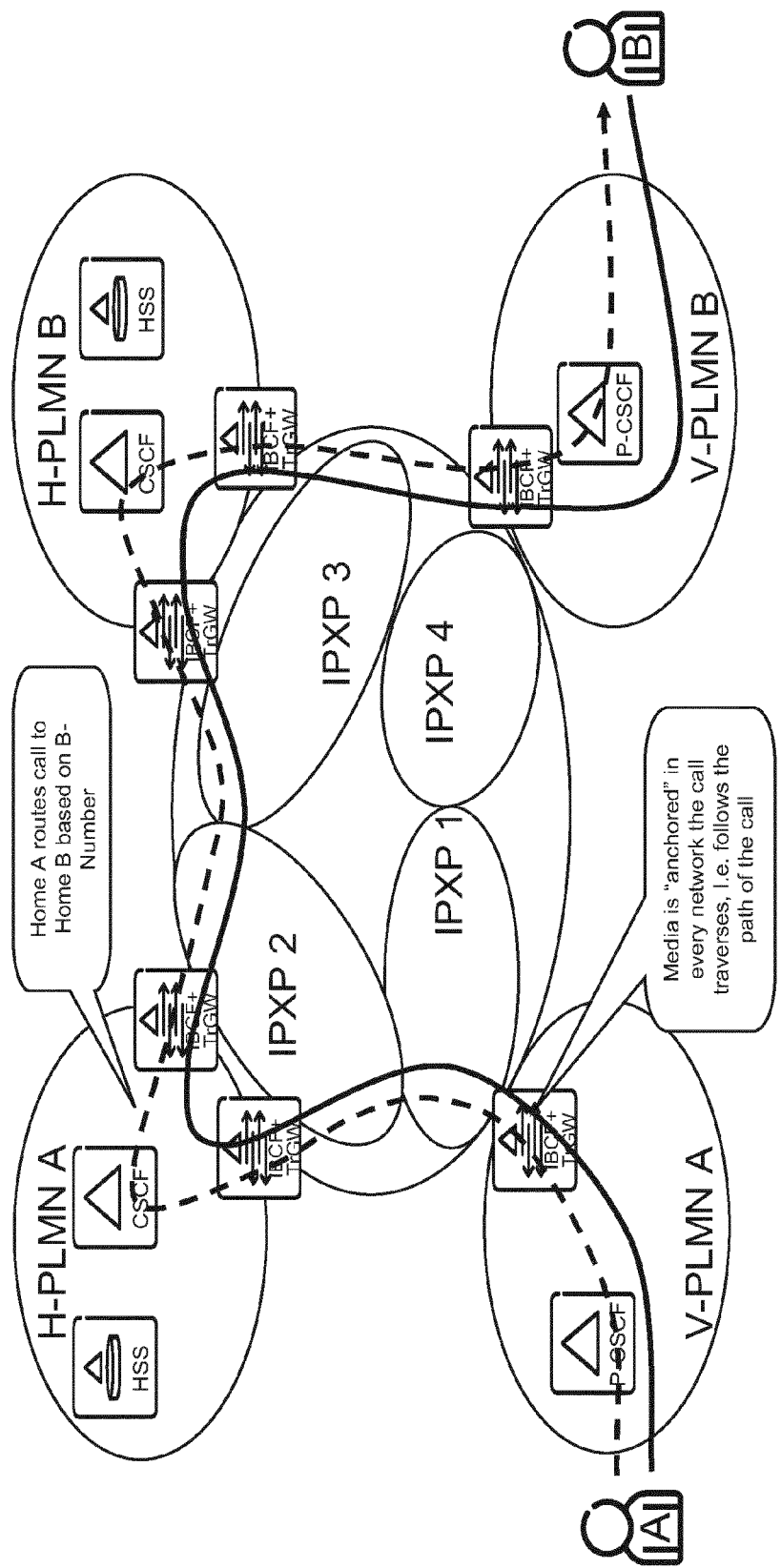
FIG. 1a is a schematic illustration for IMS routing of an originating call of roaming calling party A.

In order to overcome the problems identified above there will now be described methods and apparatus for routing an originating call of an IMS roaming user of an access network such as a VPLMN towards the home network (e.g. a H-PLMN) of the IMS roaming user based on whether the access network identifies the called party number is allowable for use in the access network.

As described previously, in most cases, based on current IMS routing procedures, an originating call from an IMS roaming user (e.g. calling party A) in a V-PLMN for calling party A will automatically be routed to the H-PLMN of the calling party A, which determines where the call should be routed. However, the H-PLMN A IMS AS or MMTel AS do not know the intention of the user of the calling party A's UE. For example, if a service number was dialed, did the user want a home service number or a visited service number? Although there is an optional function in the IR.92 standard entitled "IMS Profile for Voice and SMS" for a UE to set certain indicators in SIP signaling to indicate if the calls are for a local service/number or a home service/number, this kind of function needs to be set by a user, is not considered reliable nor readily available in all UEs.

Currently, when a called party number based on local numbering plan in a VPLM has been dialed by an IMS roamer, then it is most likely that the HPLMN IMS network will not be able to perform correct called party number normalization because its roaming partners numbering plans (there are hundreds of these) may be unknown. In any event, if the service number corresponds to one in the VPLMN, the HPLMN would not be able to execute the service and the call will fail. Alternatively, if there are overlapping service numbers (e.g. same service number with different purposes in HPLMN and VPLMN) when the originating call reaches the HPLMN, the service in the HPLMN will be used and there no efficient or reliable way for an IMS inbound roamer to use the services of the VPLMN.

In order to address the problems identified, it is proposed to introduce an interface between IMS network nodes such as the P-CSCF (or IBCF) and a database (e.g. an external database) comprising a plurality of called party numbers that are allowable for use in the VPLMN. This interface allows a mechanism to be implemented, or a process to be executed, in the IMS network node that allows it to detect and distinguish the local numbers such as local service numbers in originating calls from IMS roaming UEs or calling party UE's (e.g. IMS inbound roamers).

For example, when an IMS inbound roamer dials a service number, based on policy a trigger to the database can be executed to resolve the nature of the dialed number. Based on the response from the database, additional steps for correction of the dialed number may be taken in the IMS network node to enable correct handling of the originating call. This may involve manipulating the SIP signaling (e.g. modifying the SIP INVITE request message) in relation to the originating call. As an example, the SIPINVITE request message body or header may be modified. If the SIP INVITE request message header is modified, this may entail modifying the Request-URI.

As an example of the mechanism according to the invention, a network node (e.g. P-CSCF or IBCF) may perform the following actions as part of a call set-up procedure.

1. The network node may identify whether the calling party originating the call is an inbound roamer. IMS inbound roamers will have performed an IMS registration (3GPP TS 24.229) toward its home IMS domain or H-PLMN with a domain name that does not belong to the VPLMN. The network node may be configured to recognize this different domain name. When the network node includes the functionality of a P-CSCF, then it will recognize the different domain name. If the originating call is identified to be in the same domain name as the VPLMN, then the calling party is not an IMS inbound roamer and the call is handled in the normal fashion; and 2. Once the network node has identified that the calling party is an IMS inbound roamer, the network node then determines whether the user dialed a short code/short number or any other non-normalised called party number, i.e. the dialed number is not in the international format (e.g. does not start with a '+' as in '+4681253436'.

In addition, the network node may also identify whether the node is configured for performing a roaming control. If it is not, then it may forward the originating call to a network node that is configured for performing roaming control.

Once actions 1 and 2 have been undertaken, the network node for called party numbers passing the above criterion trigger a database provisioned with called party numbers that are useable within the access network to determine whether the called party number is useable in the access network.

The network node may also be configured with a pre-configured filter to capture specific called party numbers (e.g. service numbers according to a local dial plan), and then trigger the database accordingly. This may reduce the number of originating calls that should be routed by the mechanism according to the invention.

The database may be provisioned with called party numbers such as service numbers that are allowed to be used by the inbound roamer in the current access network (V-PLMN). This may be due to a roaming agreement being in place between the H-PLMN of the calling party and the V-PLMN). This will also capture service numbers that are in conflict in the V-PLMN and H-PLMN and based on the agreement, a response is sent to the network node to instruct the network node how the called party number should be treated.

Figure 1B:
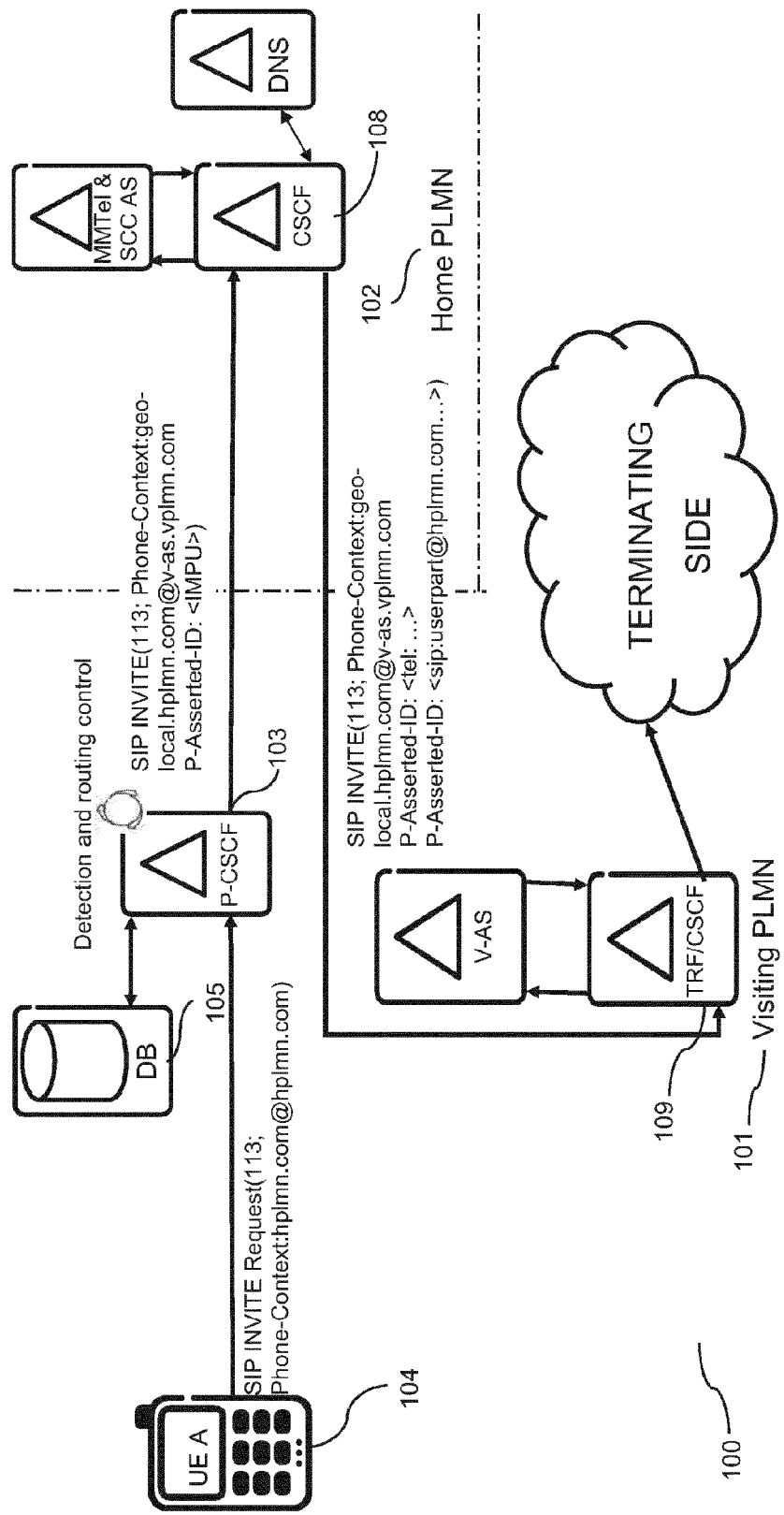
FIG. 1b is a schematic illustration of another example IMS network for routing an originating call according to the invention.

FIG. 1b provides a schematic illustration of the IMS network architecture 100 comprising a V-PLMN 101 and H-PLMN 102 for implementing a process/mechanism according to the invention in an network node 103 having P-CSCF functionality and/or IBCF functionality. The V-PLMN 101 includes UE A 104, an IMS inbound roamer, in which in step A, the user of UE A 104 dials called party number (e.g. 133) when in the V-PLMN 101 to reach a local service located within the V-PLMN 101. Currently, without the mechanism/processes according to the invention, such a call will be routed to H-PLMN 102 and will fail or connect to the home based 133 service.

On dialing the called party number, UE A 104 originates a call by sending a SIP INVITE request message, the SIP INVITE request message includes the called party number (e.g. 113) and the phone-context parameter set to the domain name of the H-PLMN (e.g. hplnmn.com@hplmn.com) because UE A 104 will have performed an IMS registration toward its home IMS domain or H-PLMN 102, and so uses the H-PLMN 102 domain name (e.g. hplnmn.com@hplmn.com).

On receiving the SIP INVITE request message, the network node 103 that is within V-PLMN 101 performs a process according to the invention based on a detection and routing control function. The detection and routing control function applies the above actions 1 and 2 and recognizes that the called party number is a service number from a call originated by an IMS inbound roamer (e.g. the service number matches the "filter") or any other called party number that is not used for an international call with an international prefix. The detection and routing control function performs a query to access or trigger a database 105 to determine whether the called party number is allowable for use in the V-PLMN. This may involve checking a list of designated called party numbers, policies or agreements with particular roaming partners that indicate the called party number may be used for a called party or service within V-PLMN 101. The database 105 sends its results/indication to the network node 103. On receiving the indication that the called party number (e.g. 133) is an allowable called party number e.g. it may be a local service number, the network node 103 manipulates the SIP signaling (e.g. the SIP INVITE request message) at this point to ensure that H-PLMN 102 receives sufficient information to recognise the originating call as a V-PLMN service or call to a called party in the V-PLMN.

Manipulating the SIP signaling may be implemented by modifying the SIP INVITE request message associated with the originating call by changing the phone-context (e.g. geo-local.hoplmn@v-as.vplmn.com) such that the H-PLMN 102 will route the call back to the V-PLMN 101 for processing. Additionally, an indication or routing parameter may be set such that the H-PLMN 101 will recognize the originating call should be routed the call back to the V-PLMN 101 may be inserted into the SIP signaling. This may also be accomplished by modifying the parameters of the R-URI of the SIP INVITE request message. Alternatively, the body of the SIP INVITE request message may be modified with additional informational elements that the H-PLMN 102 may be configured to recognize as requiring the call to be routed back to the V-PLMN 101.

On receipt of the modified SIP signaling (e.g. SIP INVITE (113; Phone-Context:geo-local.hplmn.com@v-as.vplmn-.com; P-Asserted-ID: <IMPU>)) at the IMS network of HPLMN 102 (e.g. CSCF 108, DNS and MMTel & SCC AS nodes), the IMS nodes of the HPLMN 102 recognise that the call should be routed back to the V-PLMN 101 such that the call is returned/routed to VPLMN 101 via the appropriate SIP signaling (e.g. SIP INVITE(113; Phone-Context:geo-local.hplmn.com@v-as.vplmn.com; P-Asserted-ID: <tel: . . .>; P-Asserted-ID: <sip:userpart@hplmn.com. . .>)) for further service execution (i.e. call termination with the called party) in the IMS nodes (e.g. V-As and/or TRF/CSCF) of VPLMN 101.

In particular, a network node of the H-PLMN 102 e.g. the CSCF 108 (which may have the functionality of a P-CSCF or IBCF of the H-PLMN 102) may be configured to receive the SIP INVITE request message associated with the originating call (e.g. SIP INVITE(113; Phone-Context:geo-local.hplmn.com@v-as.vplmn.com; P-Asserted-ID: <IMPU>)). The SIP INVITE request message including the called party number (e.g. 113) associated with the call and an indication (e.g. Phone-Context:geo-local.hplmn.com@v-as.vplmn.com; P-Asserted-ID: <IMPU>)) that the called party number is allowable for use in the V-PLMN 101. The network node 108 is configured to detect the indication within the received SIP INVITE request message that the called party number is allowable for use in the V-PLMN 101. This may involve conferring with other IMS nodes such as the DNS and MMTel & SCC AS nodes in relation to routing policies or other issues regarding the originating call. The network node then transmits the received SIP INVITE request message back towards the V-PLMN 101 (e.g. SIP INVITE(113; Phone-Context:geo-local.hplmn.com@v-as.vplmn.com; P-Asserted-ID: <tel: . . .>; P-Asserted-ID: <sip:userpart@hplmn.com. . .>)), which as been appropriately modified such that the V-PLMN 101 may act accordingly and performing the terminating call set-up signalling towards the called party or service at the terminating side of the call within V-PLMN 101. The SIP INVITE message transmitted from the H-PLMN 102 towards the V-PLMN 101 may be routed to an anchor point such as a Transit Roaming Function (TRF)/CSCF node 109 and/or a visiting AS (V-AS) (and other nodes) for call processing followed by performing the terminating call set-up signalling towards the called party or service at the terminating side of the call within V-PLMN 101.

Figure 1C:
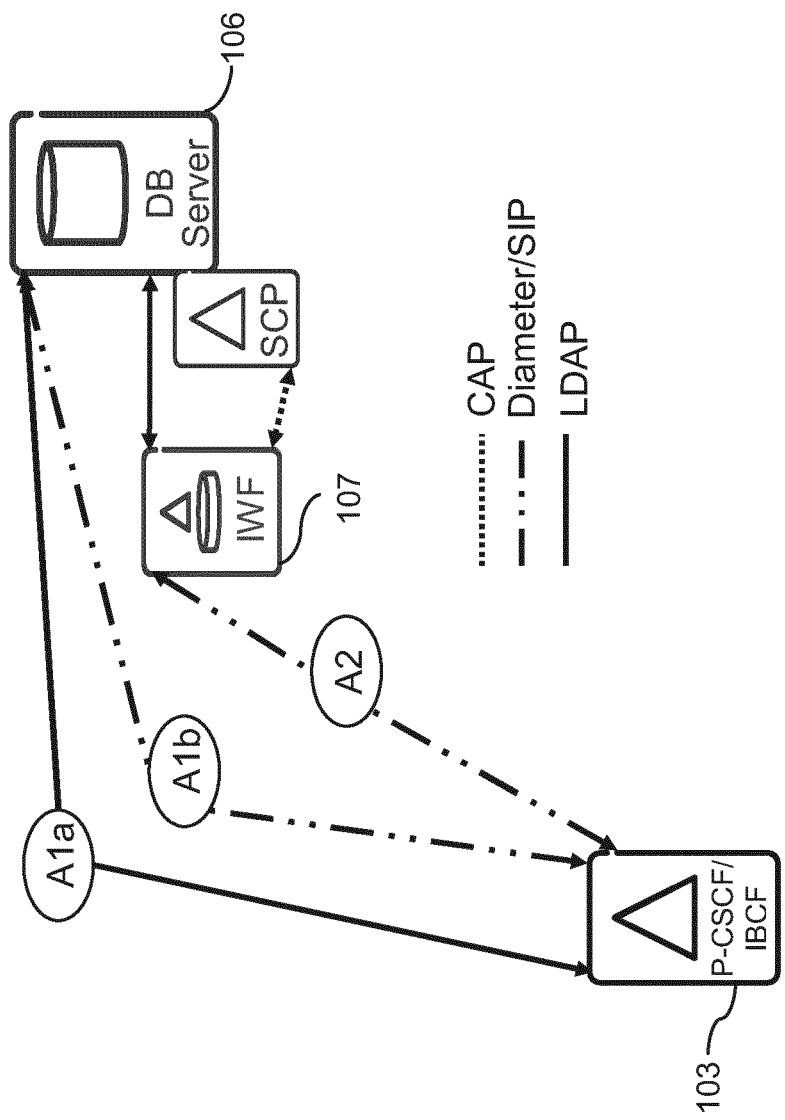
FIG. 1c is a schematic illustration of an arrangement for a network node according to the invention to interface with a database.

FIG. 1c is a schematic illustration of various example interfaces for allowing the network node 103 according to the invention to trigger or access one or more storage mediums, databases or database servers. For simplicity, by way of example only, FIG. 1c illustrates a database 105 based on a database server (DB server) that is provisioned with a plurality of called party numbers. The terms access network and VPLMN 101 are used interchangeably and database or database server are also used interchangeably. The structure of the database 105 may arranged such that the plurality of called party numbers include a plurality of service numbers in the form of records, tables or lists of called party numbers or any other suitable form of data or database structure. The database 105 may further include data representative of an indication of whether the called party numbers are allowable or not. Alternatively of in addition, the database 105 may include policies or agreements with third parties (e.g. other network operators) indicating a set of called party numbers or service numbers are allowable and/or not allowable for use in the access network (VPLMN 101).

The interface from the network node 105 (e.g. a P-CSCF or IBCF) toward the database 105 may be based on any suitable access/query language or access/communications protocol for use in querying the database 105 or directory system of the database 105. For example, the interface form the network node 103 toward the database 105 may be based on suitable protocols such as Lightweight Directory Access Protocol (LDAP), Diameter, or even SIP and SDP messaging protocols for accessing/querying the database 105 and receiving responses from the database 105. In FIG. 1a several alternative direct interfaces based on LDAP are depicted by alternative A1*a* or alternatives A1*b* and A2 may be based on a Diameter/SIP interface. Alternative A2 is based on Diameter/SIP interface that is linked toward an IWF (Interworking Function), which may convert the Diameter/SIP protocol into the appropriate protocol for accessing/querying and receiving responses from the database system of database 105, which may be, for example, an LDAP DB or a database 105 linked with a Service Control Point (SCP) etc. The database 105 may be an internal database of network node 103 or an external database (it may even be located in another access network) and provisioned with called party numbers allowable for use in the V-PLMN 101 or access network, which may be in the form of policies, dialing plans for the V-PLMN 101 or agreements between V-PLMN 101 and HPLMN 102 or other access networks, H-PLMNs and/or VPLMNs.

The network node 103 queries, using a suitable protocol, the database 105 as to whether the called party number is allowable for use in the access network or VPLMN 101. This may be performed by the network node 103 accessing or triggering the database 105 to indicate whether the called party number is allowable for use in the access network 101 based on the data in the database 105. The network node 103 may receive a response from the database 105 indicating whether the called party number is allowable for use in the access network 101. At the network node 103, the received response from the database 105 or database server 105 may be analysed to determine whether the called party number is allowable for use in the access network 101. However, the response from the database 105 may be in the form of a message that includes a positive or negative indication of whether the called party number is allowable.

By way of example only, LDAP may be used for querying data structures within the database 105 or database server 105, where both queries to the database 105 and responses from the database 105 are based on the actual data stored in the database 105. An LDAP query may be an LDAP Search including the short number or the called party number received in the SIP INVITE request message. If the called party number is found, an LDAP response may include associated information elements such as the called party number and other information associated with the called party number (e.g. 1234, PIZZA, complete number=+ 46xxxxxx). If the called party number is not found, then a response such as an LDAP error may be returned, which may take the form "distinguished name not found" or any other informational or descriptive element and the like. For other suitable protocols such as Diameter, SIP and/or SDP messaging the database 105 or database server 105 may be configured to provide a more explicit response (e.g. "local number" or even "set a phone context parameter to the access network domain name") that depends on the type of query.

Although the network node 103 queries the database 105 and receives a response that may indicate whether the called party number is allowable for use in the access network, it is to be appreciated by the person skilled in the art that the network node 103 can be configured for receiving any type of response from the database 105 or a database server 105 or any other storage media or suitable system and interpreting or analysing that response to determine whether the called party number is allowable for use in the access network 101 (VPLMN).

Figure 2A:
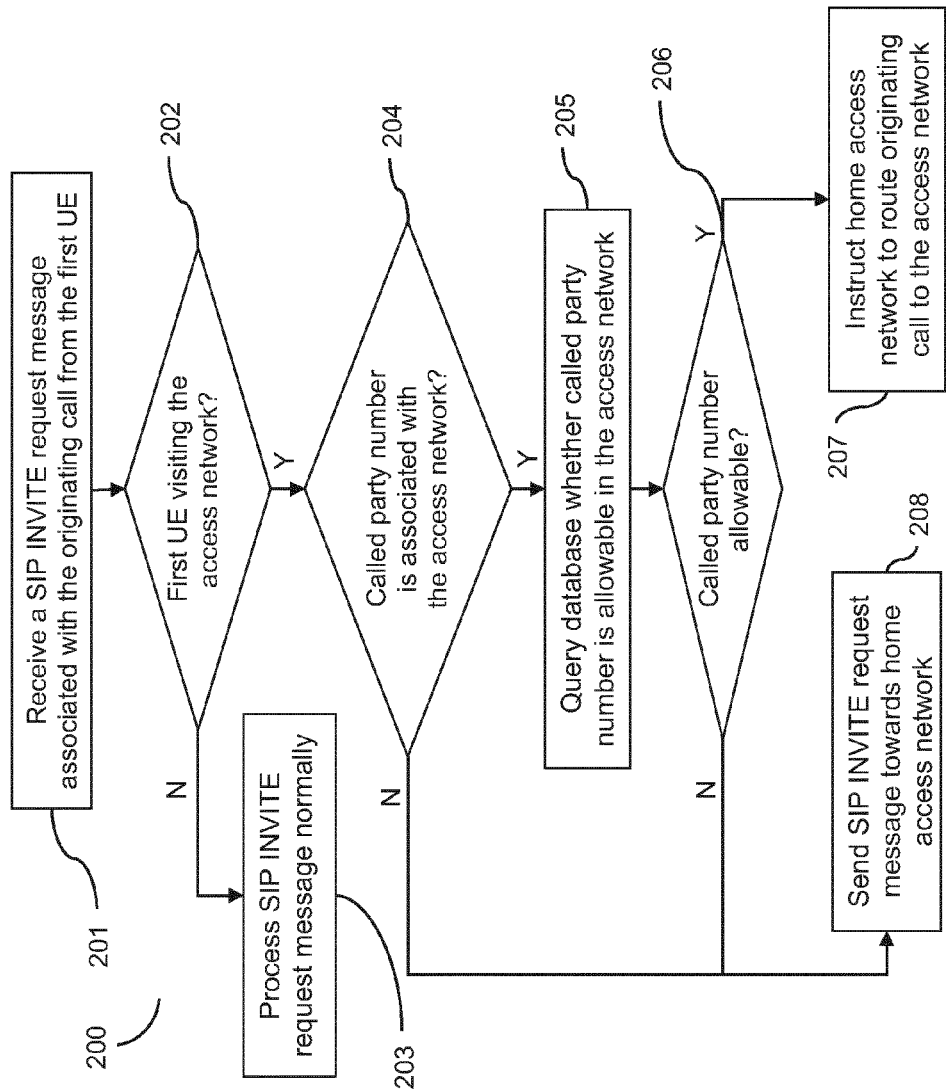
FIG. 2a is a flow diagram illustrating a process for routing an originating call according to embodiments of the invention.

FIG. 2*a* is a flow diagram illustrating an example process 200 according to the invention for routing an originating call from a first UE (e.g. calling party A) in an access network (e.g. V-PLMN 101) including an IMS network, in which the IMS network includes a network node for performing the process. The steps performed are as follows:

201. Receiving, at the network node, a SIP INVITE request message associated with the originating call from the first UE. The SIP INVITE request message includes a called party number associated with the call. The SIP INVITE request message may also include a home domain name associated with the first UE.

202. Determining whether the first UE is visiting the access network. If the first UE is determined to be visiting the access network, then proceed to step 204. Otherwise proceed to step 203.

203. Process the SIP INVITE request message using normal call handling procedures. This is because the first UE is not a visiting the access network and so is not an IMS inbound roamer.

204. Determining whether the called party number is associated with the access network. This may include determining if the called party number is a short number or a short code number or is a called party number that is not in a normalised format such as the international format. If the called party number is associated with the access network, then proceed to step 205. Otherwise proceed to step 208.

205. Querying a database, the database including a plurality of called party numbers, as to whether the called party number is allowable for use in the access network when the first UE is visiting the access network and when the called party number is associated with the access network. Proceed to step 206.

206. Determining if the called party number is allowable. This may include receiving a response message or indication from the database indicating the called party number is allowable. If the called party number is allowable then proceeding to step 207. Otherwise, proceed to step 208.

207. Instructing a home network of the first UE (e.g. an H-PLMN for the first UE) to route the originating call to the access network when a response from the query indicates the called party number is allowable for use in the access network. Proceed to finish of process or enter a wait state for the next SIP INVITE request message or response from the home network of the first UE.

208. Send the SIP INVITE request message towards the home network in the usual manner. This is because the called party number may not be allowable in the access network (e.g. not allowed due to roamer partner agreements/policies or the called party number is not recognised from the list of allowable called party numbers, etc.)

Step 202 may further determining whether the first UE is IMS registered and/or determining whether the home network is known to the network node. Step 204 may further include determining that the called party number is representative of a short code number or a short number.

The database may be provisioned with a plurality of called party numbers that may include a plurality of service numbers and/or policies or roamer agreements indicating whether the plurality of service numbers or other called party numbers are allowable for use in the access network.

Step 205 may further include triggering the database to indicate whether the called party number is allowable for use in the access network based on the service numbers, policies, and/or agreements. This may involve a simple match in the database between the called party number and the called party number stored in the database that is allowable.

Step 206 may then further include receiving a response from the database indicating whether the called party number is allowable for use in the access network. Steps 206 and/or 207 may further include determining from the received response from the database whether the called party number is allowable for use in the access network, and instructing the home network of the first UE to route the originating call to the access network when it is determined that the called party number is allowable for use in the access network.

Step 207 may further include modifying the received SIP INVITE request message to set a phone context parameter to the access network domain name when the called party number is allowable for use in the access network. The modified SIP INVITE message is then transmitted towards the home network. The phone context parameter may be within the R-URI of the SIP INVITE request message, which is then modified accordingly.

In other embodiments or alternatives, step 207 may include further modifying the received SIP INVITE request message to set a routing indication for routing the originating call from the home network to the access network when the called party number is allowable for use in the access network. The routing indication may be recognised by the home network such that the home network routes the SIP INVITE request message towards the access network. The routing indication may be within the body of the SIP INVITE request message or any other part of the SIP INVITE request message. In some implementations, the R-URI of the SIP INVITE request message may be modified to set the routing indication. A routing indication may include data representative of routing instructions for the transmission of the originating call to its final destination e.g. the called party or the access network of the called party. For example, it may be included in a message header as an address or a group of characters, which specify routing instructions for the transmission of the message towards its final destination. As another example, a routing indication may include data representative of a flag or an instruction that indicates to the home network that the originating call should be routed towards the access network that the called party is visiting, or any other network for that matter.

Although the network node may include the functionality of a P-CSCF or the functionality of an IBCF, it is to be appreciated by the person skilled in the art that any IMS network node that is suitable for performing the processes/mechanisms according to the invention.

Figure 2B:
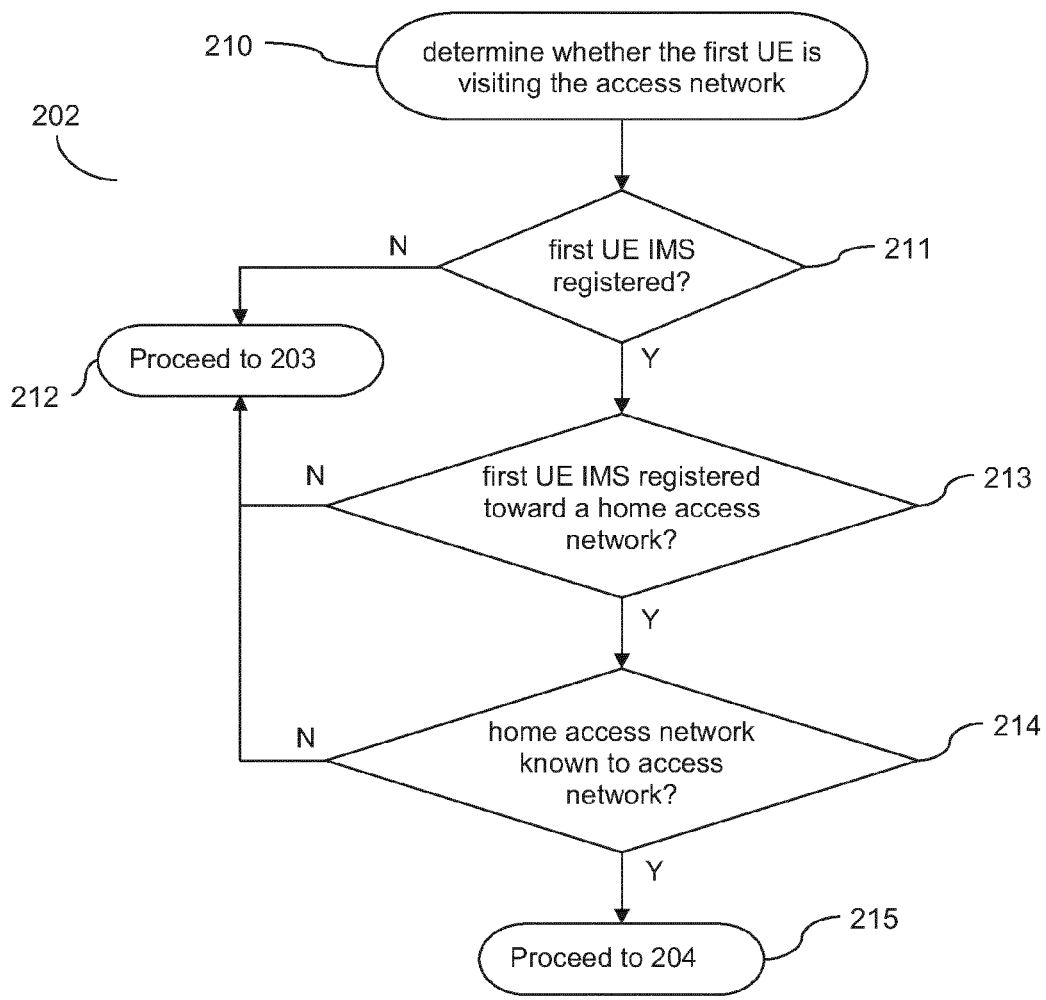
FIG. 2b is a flow diagram illustrating a process for whether the calling party is an IMS roamer according to embodiments of the invention.

FIG. 2b is a flow diagram illustrating an example process 202 performed at the network node for determining 210 whether the first UE is visiting the access network. The following steps are performed.

211. Determine whether the first UE is IMS registered. If the network node includes the functionality of a P-CSCF or IBCF, then it can detect this in the usual fashion. Otherwise, the network node may need to query a node with P-CSCF functionality or even query the HSS of the home network. If the first UE is IMS registered then proceed to step 213. If the first UE is not IMS registered, then proceed to step 212.

212. As the first UE is not IMS registered, it does not require the routing mechanism according to the invention. Proceed to step 203 of FIG. 2a.

213. Determine if the first UE is IMS registered toward a home network different to the access network. This is to determine whether the first UE is a visiting UE or an IMS roamer. If the first UE is IMS registered to the home network, then proceed to step 214. Otherwise, proceed to step 212.

214. Determine if the home network is known to the access network. If the home network is not known to the access network, then the access network will not be able to route the call appropriately. If the home network is known to the access network, then proceed to step 215. Otherwise, proceed to step 212.

215. Proceed to step 204 of FIG. 2a.

Step 214 may be modified to perform a check to determine if the access network (visiting network or VPLMN-A) that the first UE (e.g. calling party) is visiting and the home network of the first UE have any agreement as to how calls are allowed to be set-up or routed. In addition, the determination may further include checking whether the home network routing policies or implementation is compatible with the method for routing the originating call according to the invention as implemented in the access network (VPLMN).

Figure 2C:
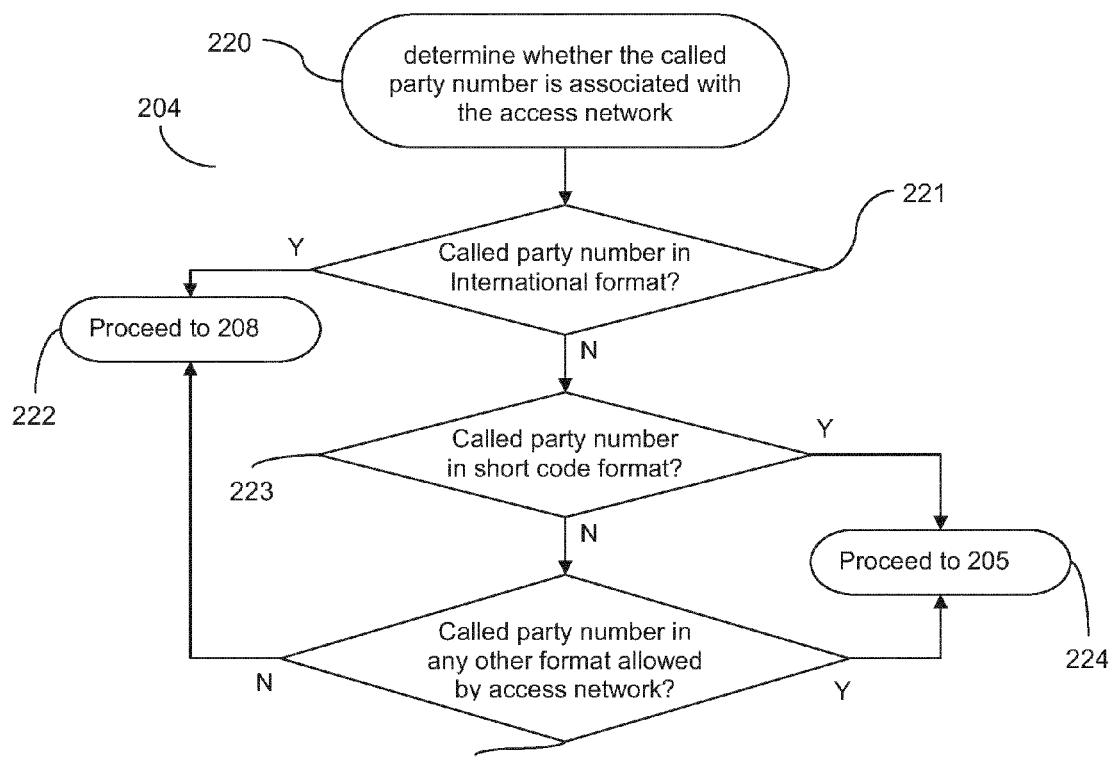
FIG. 2c is a flow diagram illustrating a process for determining whether the called party number is allowable according to embodiments of the invention.

FIG. 2c is a flow diagram illustrating an example process 204 performed at the network node for determining 220 whether the called party number is associated with the access network. The following steps are performed.

221. Determine whether the called party number is in the international format or other standardised format that indicates the originating call is not meant to be used in the access network. If the called party number is in the international format (or other standardised format) then proceed to step 222. Otherwise proceed to step 223.

222. As the called party number is meant to be used in another access network, proceed to step 208 of FIG. 2a.

223. Determine whether the called party number is in a short code format or a short number format. This indicates the called party number may be allowed to be used in the access network. If the called party number is in a short code format (or short number format), then proceed to step 225. Otherwise proceed to step 224.

224. Proceed to step 205 of FIG. 2a. This is the step of querying the database to determined whether the called party number is actually allowable for use in the access network.

225. Determine whether the called party number is in any other format that may be allowed by the access network. This indicates the called party number may be allowed to be used in the access network. If the called party number is in another format that may be allowable for use in the access network, then proceed to step 224. Otherwise proceed to step 222.

Figure 2D:
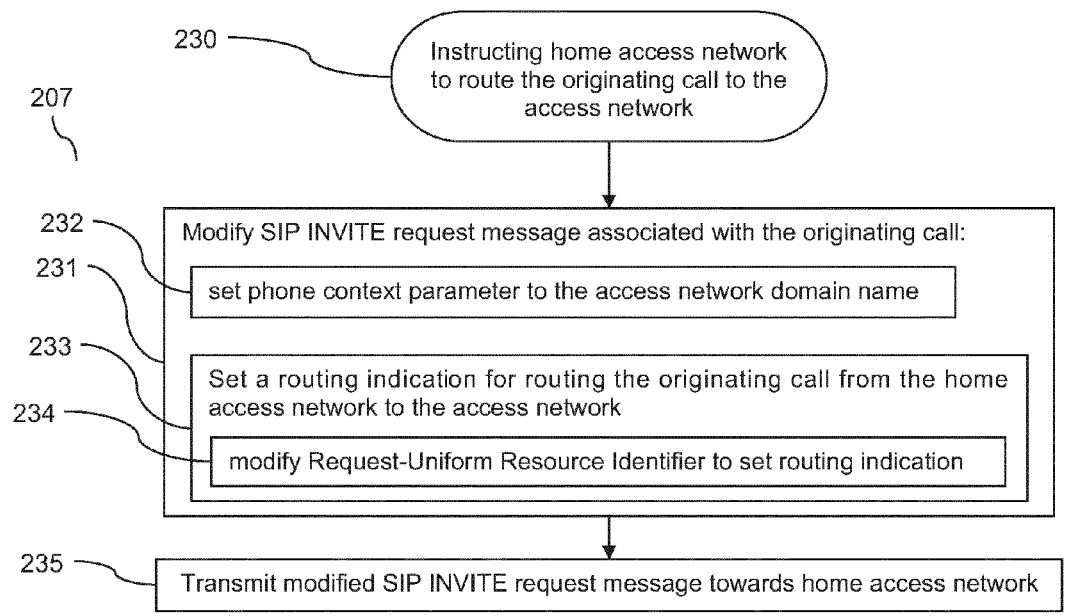
FIG. 2d is a schematic illustrating the various levels of modification that may be applied to a SIP INVITE request message for use in routing the originating call according to embodiments of the invention

FIG. 2d is a flow diagram illustrating various examples of process 207 that may be performed at the network node when instructing 230 the home network to route the originating call to the access network. The following steps are performed.

231. Modifying the SIP INVITE request message associated to the originating call to indicate to the home network that the originating call should be routed back to the access network. Proceed to step 235.

235. Transmit the modified SIP INVITE request message towards the home network.

and/or
232. Modifying the SIP INVITE request message associated to the originating call to indicate to the home network that the originating call should be routed back to the access network. The modification includes setting the phone-context parameter in the SIP INVITE request message to the access network domain name. Proceed to step 235.
235. Transmit the modified SIP INVITE request message towards the home network.
and/or
233. Modifying the SIP INVITE request message associated to the originating call to indicate to the home network that the originating call should be routed back to the access network. The modification includes setting a routing indication for routing the originating call from the home network to the access network. Proceed to step 235.
235. Transmit the modified SIP INVITE request message towards the home network.
and/or
233. Modifying the SIP INVITE request message associated to the originating call to indicate to the home network that the originating call should be routed back to the access network. The modification includes modifying the R-URI for setting a routing indication for routing the originating call from the home network to the access network. Proceed to step 235.
235. Transmit the modified SIP INVITE request message towards the home network.

Although each of the above examples of instructing the home network to route the originating call to the access network may be performed individually, it is to be appreciated by a person skilled in the art that any one of more of these examples may be combined in accordance with the invention.

Figure 2E:
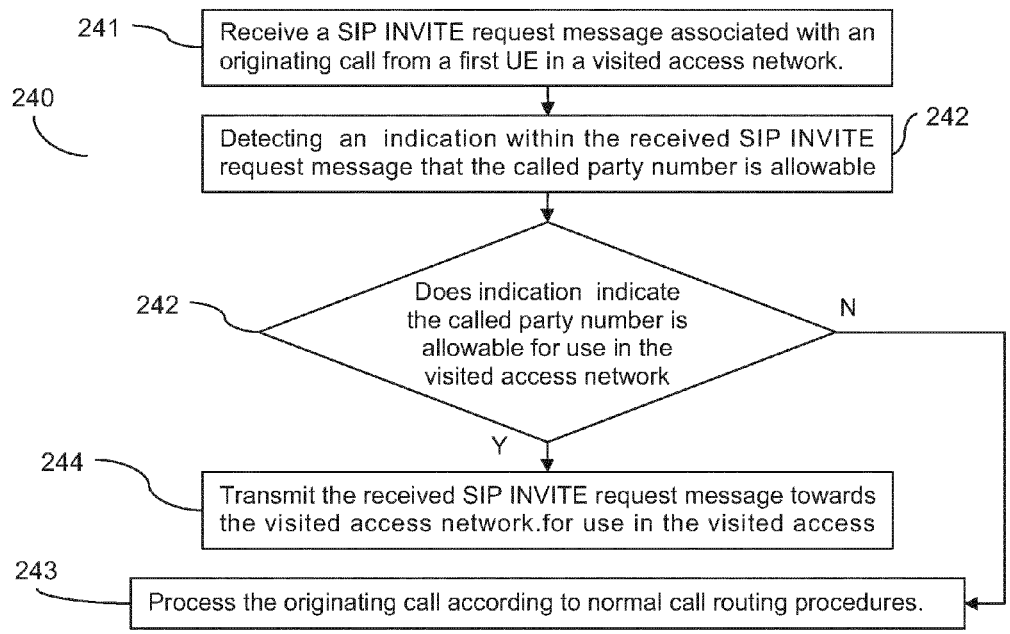
FIG. 2e is a flow diagram illustrating a process in a home network for routing an originating call according to embodiments of the invention

FIG. 2e is a flow diagram illustrating an example process 240 according to the invention for routing an originating call from a first UE (e.g. calling party A) in an access network (e.g. V-PLMN 101) including a first IMS network towards a home network (e.g. H-PLMN 102) including a second IMS network. The first IMS network including a first network node (e.g. P-CSCF 103) in the access network the first UE is visiting (e.g. V-PLMN 101). The second IMS network including a second network node (e.g. CSCF 108) in the home network of the first UE. The following steps are performed at the second network node:
241. Receiving a SIP INVITE request message associated with the originating call from the first UE in the visited access network. The SIP INVITE request message including a called party number associated with the call and an indication that the called party number is allowable for use in the visited access network.
242. Detecting the indication within the received SIP INVITE request message that the called party number is allowable for use in the visited access network. If there is an indication that indicates the called party number is allowable for use in the visited access network then proceed to step 244. Otherwise proceed to step 243.
243. Process the originating call according to normal call routing procedures.
244. Transmits the received SIP INVITE request message towards the visited access network. This may involve modifying the received SIP INVITE request message accordingly, so the visited access network recognises it appropriately and acts accordingly.

Figure 3A:
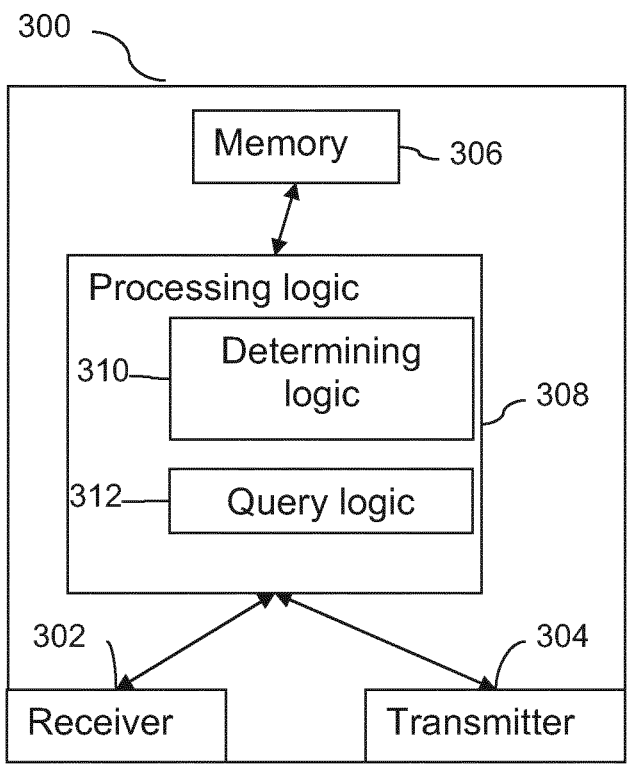
FIG. 3a is a schematic diagram of a network node according to embodiments of the invention.

FIG. 3a is a schematic illustration of a network node 300 for use in routing an originating call from a first UE or calling party in an access network comprising an IMS network. The network node 300 includes a receiver 302, a transmitter 304, a memory unit 306, and processing logic 308, the processing logic 308 being connected to the receiver 302, to the transmitter 304, and to the memory unit 306.

In operation, the receiver 302 is configured to receive a SIP INVITE request message associated with the originating call from the first UE. The SIP INVITE request message includes a called party number associated with the call. The SIP INVITE request message may also include a home access domain name. The processing logic 308 includes determining logic 310 that is configured to determine whether the first UE is visiting the access network and to determine whether the called party number is associated with the access network. The processing logic 308 further includes query logic 312 configured to query a database (not shown), the database including a plurality of called party numbers, as to whether the called party number is allowable for use in the access network when the determining logic 310 determines that the first UE is visiting the access network and that the called party number is associated with the access network. The transmitter 304 is configured to send the query to the database. The processing logic 308 and the transmitter 304 are further configured to instruct a home network of the first UE to route the originating call to the access network when a query response from the database indicates that the called party number is allowable for use in the access network.

The determining logic 310 may be further configured to determine whether the first UE is IMS registered for use in determining whether the first UE is visiting the access network. The determining logic 310 may be further configured to determine whether the home network is known to the network node when the first UE is determined to be visiting the access network. The determining logic 310 for determining whether the called party number is associated with the access network is further configured to determine that the called party number is representative of a short code number or a short number.

The database may be arranged such that the plurality of called party numbers include a plurality of service numbers, and the database includes records, tables or lists of called party numbers that are allowable or not, or policies or agreements indicating whether the plurality of called party numbers or service numbers are allowable for use in the access network.

The transmitter 304 and query logic 312 are further configured to trigger the database to indicate whether the called party number is allowable for use in the access network based on the data in the database. The receiver 302 and the processing logic 308 are further configured to receive a response from the database indicating whether the called party number is allowable for use in the access network. The determining logic 310 or other logic may be further configured to determine, from the received response from the database, whether the called party number is allowable for use in the access network. Based on this determination the processing logic 308 and the transmitter 304 are further configured to instruct the home network of the first UE to route the originating call to the access network when the determining logic 310 indicates that the called party number is allowable for use in the access network.

The processing logic 308 may be further configured to instruct the home network by modifying the received SIP INVITE request message to set a phone context parameter to the access network domain name when the called party number is allowable for use in the IMS network. The transmitter 304 may be further configured to instruct the home network by transmitting the modified SIP INVITE request message towards the home network. In addition or alternatively, the phone context parameter may be modified within the Request-Uniform Resource Identifier, R-URI, of the SIP INVITE request message.

In addition or alternatively, the processing logic 308 may be further configured to instruct the home network by further modifying the received SIP INVITE request message to set a routing indication for routing the originating call from the home network to the access network when the called party number is allowable for use in the access network. Additionally or alternatively, the processing logic 308 is further configured to modify the R-URI of the SIP INVITE request message to set the routing indication.

The network node 300 may include the functionality of a P-CSCF node or an IBCF.

Figure 3B:
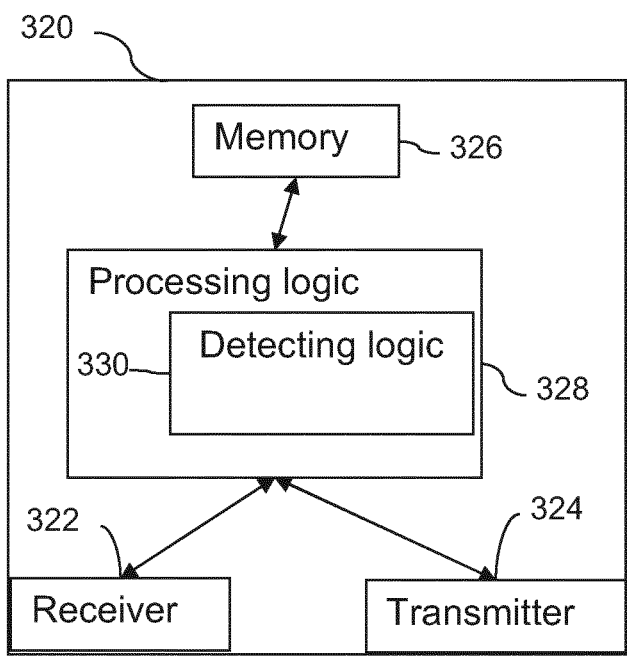
FIG. 3b is a schematic diagram of another network node according to embodiments of the invention.

FIG. 3b is a schematic illustration of a network node 320 for use in routing an originating call from a first UE or calling party in an access network comprising a first IMS network towards a home network including a second IMS network. The first IMS network includes a first network node 300 associated with the access network the first UE is visiting. The second IMS network includes the network node 320, which is associated with a home network of the first UE. The network node 320 includes a receiver 322, a transmitter 324, a memory unit 326, and processing logic 328, the processing logic 328 being connected to the receiver 322, to the transmitter 324, and to the memory unit 326.

In operation the receiver is configured to receive a SIP INVITE request message associated with the originating call from the first UE in the visited access network. The SIP INVITE request message being transmitted from the second network node 300. The SIP INVITE request message including a called party number associated with the call and an indication that the called party number is allowable for use in the visited access network. The processing logic 328 is configured to detect the indication within the received SIP INVITE request message that the called party number is allowable for use in the visited access network. If it is determined that the called party number is allowable for use in the visited access network, the transmitter 324 and processing logic 328 are configured to transmit the SIP INVITE request message towards the visited access network.

The network node 320 may include the functionality of a P-CSCF node or an IBCF. The network nodes 300 and/or 320 as herein described can include memory units 306 and 326 and processing logics 308 and 328, which can be used for storing and executing a computer program, comprising computer readable code which, when executed by the processing logics 308 and 328, respectively, causes the network node(s) 300 and/or 320 to perform the relevant methods, procedures, or processes of the invention as described herein. Such computer programs as described herein can be incorporated within one or more computer program products, each comprising a computer readable medium and one or more of the computer programs, where one or more of the computer programs are stored on the computer readable medium.

It will be appreciated by the person of skill in the art that various modifications may be made to the above described examples and/or embodiments without departing from the scope of the present invention.

The invention claimed is:

1. A method of routing an originating call from a first user equipment, UE, in an access network comprising an Internet Protocol Multimedia Subsystem, IMS, network, wherein the IMS network includes a network node, the method comprising:
    receiving, by the network node, a SIP INVITE request message associated with the originating call from the first UE, the SIP INVITE request message including a called party number associated with the call;
    the network node determining whether the first UE is visiting the access network and whether the called party number is associated with the access network;
    as a result of determining that the first UE is visiting the access network and that the called party number is associated with the access network, the network node determining whether the called party number is allowable in the access network;
    as a result of determining that the called party number is allowable in the access network, the network node modifying the received SIP INVITE request message; and
    the network node transmitting the modified SIP INVITE request message towards a home network of the first UE, wherein the modified SIP INVITE request message includes information that causes the home network of the first UE to route the originating call to the access network.

2. The method according to claim 1, wherein the step of determining whether the first UE is visiting the access network further comprises determining whether the first UE is IMS registered.

3. The method according to claim 1, wherein the step of determining whether the first UE is visiting the access network further comprises determining whether the home network is known to the network node.

4. The method according to claim 1, wherein the step of determining whether the called party number is associated with the access network further comprises determining that the called party number is representative of a short code number or a short number.

5. The method according to claim 1, wherein determining whether the called party number is allowable in the access network comprises:
    the network node querying a database, wherein
        the database comprises a plurality of called party numbers and policies,
        the plurality of called party numbers include a plurality of service numbers, and
        the policies indicate whether the plurality of service numbers are allowable for use in the access network; and
    the network node receiving a response transmitted by the database in response to the query, the response indicating whether the called party number is allowable for use in the access network.

6. The method according to claim 5, further comprising:
    the network node determining, from the received response transmitted by the database, whether the called party number is allowable for use in the access network.

7. The method according to claim 1, wherein modifying the received SIP INVITE request message comprises:
    modifying the received SIP INVITE request message to set a phone context parameter to the access network domain name.

8. The method according to claim 7, wherein the phone context parameter is within the Request-Uniform Resource Identifier, R-URI, of the SIP INVITE request message.

9. The method according to claim 7, wherein modifying the received SIP INVITE request message comprises:
modifying the received SIP INVITE request message to set a routing indication for routing the originating call from the home network to the access network.

10. The method according to claim 9, wherein the modified SIP INVITE request message further includes modifying the R-URI of the received SIP INVITE request message to set the routing indication.

11. The method according to claim 1, wherein the network node includes the functionality of a proxy call session control function or the functionality of an interconnection border control function.

12. A network node for routing an originating call from a first user equipment, UE, in an access network comprising an Internet Protocol Multimedia Subsystem, IMS, network, the network node comprising:
a receiver;
a transmitter;
a memory; and
a processor, the processor coupled to the memory and configured to:
employ the receiver to receive a SIP INVITE request message associated with the originating call from the first UE, the SIP INVITE request message including a called party number associated with the call;
determine whether the first UE is visiting the access network and to determine whether the called party number is associated with the access network;
as a result of determining that the first UE is visiting the access network and that the called party number is associated with the access network, determine whether the called party number is allowable in the access network;
as a result of determining that the called party number is allowable in the access network, modify the received SIP INVITE request message; and
employ the transmitter to transmit the modified SIP INVITE request message towards a home network of the first UE, wherein the modified SIP INVITE request message includes information that causes the home network of the first UE to route the originating call to the access network.

13. The network node according to claim 12, wherein the processor is further configured to determine whether the first UE is IMS registered for use in determining whether the first UE is visiting the access network.

14. The network node according to claim 12, wherein the processor is further configured to determine whether the home network is known to the network node when the first UE is determined to be visiting the access network.

15. The network node according to claim 12, wherein the processor is further configured to determine that the called party number is representative of a short code number or a short number.

16. The network node according to claim 12, wherein the processor is further configured to:
employ the transmitter to query a database, wherein
the database comprises a plurality of called party numbers and policies,
the plurality of called party numbers include a plurality of service numbers, and
the policies indicate whether the plurality of service numbers are allowable for use in the access network; and
employ the receiver to receive a response transmitted by the database in response to the query, the response indicating whether the called party number is allowable for use in the access network.

17. The network node according to claim 16, wherein the processor is further configured to determine, from the received response from the database, whether the called party number is allowable for use in the access network.

18. The network node according to claim 12, wherein the processor is further configured to modify the received SIP INVITE request message to set a phone context parameter to the access network domain name.

19. The network node according to claim 18, wherein the phone context parameter is within the Request-Uniform Resource Identifier, R-URI, of the SIP INVITE request message.

20. The network node according to claim 18, wherein the processor is further configured to modify the received SIP INVITE request message to set a routing indication for routing the originating call from the home network to the access network.

21. The network node according to claim 20, wherein the modified SIP INVITE request message further includes the R-URI of the received SIP INVITE request message to set the routing indication.

22. The network node according to claim 12, wherein the network node comprises the functionality of a proxy call session control function or the functionality of an interconnection border control function.

23. A method of routing an originating call from a first user equipment, UE, in an access network comprising an Internet Protocol Multimedia Subsystem, IMS, network, comprising the steps of:
receiving, by a home network node, a modified SIP INVITE request message transmitted by an access node in a visited access network, wherein
the modified SIP INVITE request message transmitted by the access node in the visited access network is a modified version of an original SIP INVITE request message transmitted by the UE, and
the modified SIP INVITE request message includes a parameter that causes the home network node to forward the modified SIP INVITE request message to the visited access network and said parameter is not included in the original SIP INVITE request message; and
as a result of receiving the modified SIP INVITE request message transmitted by the access node in the visited access network, the home network node transmitting the modified SIP INVITE request message towards the visited access network.

24. A home network node for use in routing an originating call from a first user equipment, UE, in an access network comprising an Internet Protocol Multimedia Subsystem, IMS, network, the home network node comprising:
a receiver;
a transmitter;
a memory; and
a processor, the processor coupled to the memory and configured to:
employ the receiver to receive a modified SIP INVITE request message transmitted by an access node in a visited access network, wherein
- the modified SIP INVITE request message transmitted by the access node in the visited access network is a modified version of an original SIP INVITE request message transmitted by the UE, and
- the modified SIP INVITE request message includes a parameter that causes the home network node to forward the modified SIP INVITE request message to the visited access network and said parameter is not included in the original SIP INVITE request message;

as a result of receiving the modified SIP INVITE request message transmitted by the access node in the visited access network, employ the transmitter to transmit the modified SIP INVITE request message towards the visited access network.

* * * * *